United States Patent
Sakurai

(10) Patent No.: US 10,210,359 B2
(45) Date of Patent: Feb. 19, 2019

(54) READING APPARATUS

(71) Applicant: TOSHIBA TEC KABUSHIKI KAISHA, Tokyo (JP)

(72) Inventor: Wataru Sakurai, Izu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/673,950

(22) Filed: Aug. 10, 2017

(65) Prior Publication Data
US 2018/0053024 A1    Feb. 22, 2018

(30) Foreign Application Priority Data
Aug. 22, 2016 (JP) .................... 2016-162124

(51) Int. Cl.
G06K 7/08    (2006.01)
G06K 7/10    (2006.01)
G06K 7/00    (2006.01)
G06K 19/077    (2006.01)

(52) U.S. Cl.
CPC ........... *G06K 7/10366* (2013.01); *G06K 7/00* (2013.01); *G06K 7/10316* (2013.01); *G06K 19/077* (2013.01)

(58) Field of Classification Search
CPC .. G06K 7/10366; G06K 7/00; G06K 7/10316; G06K 19/077
USPC ................. 235/451, 449, 383, 384, 385, 450
See application file for complete search history.

(56) References Cited

U.S. PATENT DOCUMENTS

| | | | |
|---|---|---|---|
| 9,208,362 B1 * | 12/2015 | Fink ................. | G06K 19/07749 |
| 2002/0183882 A1 | 12/2002 | Dearing et al. | |
| 2010/0109841 A1 | 5/2010 | Yamada et al. | |
| 2014/0197954 A1 | 7/2014 | Caputo et al. | |
| 2016/0364640 A1 * | 12/2016 | Dachniwskyj ... | G06K 19/07775 |
| 2018/0025266 A1 | 1/2018 | Sakurai | |
| 2018/0034149 A1 | 2/2018 | Ohishi | |

FOREIGN PATENT DOCUMENTS

| | | |
|---|---|---|
| EP | 3276743 A1 | 1/2018 |
| EP | 3282386 A2 | 2/2018 |
| JP | 2005-267075 | 9/2005 |

OTHER PUBLICATIONS

Extended European Search Report dated Feb. 23, 2018 filed in counterpart European Patent Application No. 17187130.4 (8 pages).

* cited by examiner

*Primary Examiner* — Karl D Frech
(74) *Attorney, Agent, or Firm* — Kim & Stewart LLP

(57) ABSTRACT

According to one embodiment, a reading apparatus for reading a wireless tag includes a housing having a chamber and an opening providing an entrance to the chamber, a door attached to the housing and covering the opening when closed and permitting access to the chamber when opened, and an antenna within the housing and configured to emit a radio wave to read information from a wireless tag inside the chamber, a radiation surface of the antenna being parallel to a first inner wall surface and a second inner wall surface of the housing facing each other. The distance between the first and second inner wall surfaces is at least one half of a wavelength of a radio wave emitted from the antenna, and is a length based on an odd number multiple of a quarter of the wavelength.

18 Claims, 10 Drawing Sheets

PRIOR ART

READING APPARATUS

CROSS-REFERENCE TO RELATED APPLICATION

This application is based upon and claims the benefit of priority from Japanese Patent Application No. 2016-162124, filed Aug. 22, 2016, the entire contents of which are incorporated herein by reference.

FIELD

Embodiments described herein relate generally to a reading apparatus.

BACKGROUND

In the related art, there is a reading apparatus which reads information stored in an RFID tag, also referred to as a wireless tag. This apparatus can be used for various purposes and provided in various forms. For example, there is a reading apparatus that may read an RFID tag placed in a storage container that has a side wall or side walls covered with a radio wave absorbing material so only the RFID tag within the storage container is read by the reading apparatus. The tag information is read by the reading apparatus through an antenna that is provided proximate to or in a table on which the storage container is placed or mounted.

However, in the above described configuration in the related art, when the position of the storage container is not fully aligned with the antenna, an RFID tag outside of the storage container may respond to a radio wave transmitted by the antenna to the outside of the storage container. Therefore, there exists a configuration in which the antenna (or amounting table including the antenna) is placed in the housing having radio wave absorbing walls or the like, a range to which radio waves from the antenna travel is thus limited to the inside of the housing. The housing can include a door or the like to permit documents to be placed in the housing then enclosed inside the housing.

However, depending on the size of the housing, the storage container may contain a region where an electric field intensity is not strong enough for reading the tag information, due to interference of a radio wave reflected inside of the housing. If the RFID tag is placed in this region, referred to as the null point, a reading miss may occur.

DETAILED DESCRIPTION

In general, according to one embodiment, a reading apparatus for reading a wireless tag includes a housing having a chamber and an opening providing an entrance to the chamber, a door attached to the housing and covering the opening when closed and permitting access to the chamber when opened, and an antenna within the housing and configured to emit a radio wave to read information from a wireless tag inside the chamber, a radiation surface of the antenna being parallel to a first inner wall surface and a second inner wall surface of the housing facing each other. The distance between the first and second inner wall surfaces is at least one half of a wavelength of a radio wave emitted from the antenna, and is a length based on an odd number multiple of a quarter of the wavelength.

First Embodiment

Figure 1:
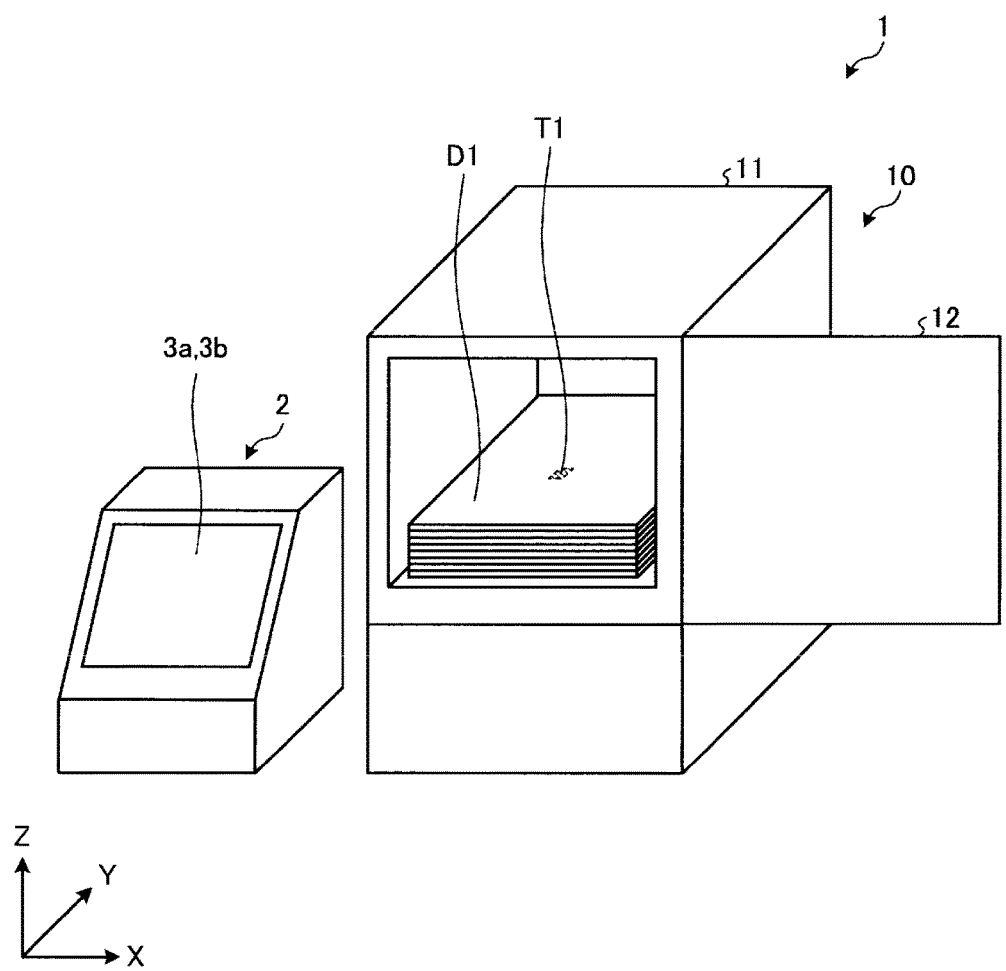
FIG. 1 is an external perspective view of a document reading apparatus according to a first embodiment.

FIG. 1 illustrates an external perspective view of a document reading apparatus 1 according to a first embodiment. The document reading apparatus 1 reads an RFID (Radio Frequency IDentifier) tag T1 which is attached to a document D1 such as a billing statement, an admission ticket, a book, a driver's license, a passport, or any document. For example, the document reading apparatus 1 is provided on a desk or the like. FIG. 1 illustrates a reading unit 10 with a door 12 open.

The document reading apparatus 1 includes a main body unit 2, and the reading unit 10 (e.g., reader-writer device). The main body unit 2 includes a display 3b and a touch panel 3a on a front face of the display 3b. For example, a liquid crystal display device is used as the display 3b.

The reading unit 10 is a reader-writer device which can read information from an RFID tag T1, which is attached to the document D1, and to write data into the RFID tag T1. The RFID tag T1 stores information such as a document code for identifying the document D1 to which the RFID tag T1 is attached.

The reading unit 10 is connected to the main body unit 2 by a cable (not illustrated), or the like. The reading unit 10 outputs various types of information such as the document code, which has been read from the RFID tag T1, to the main body unit 2 in a wired manner or in wireless manner. The main body unit 2 and the reading unit 10 are separate units. However, in some embodiments, the main body 2 and the reading unit 10 may be integrated.

Each RFID tag T1 is provided with a storage medium for writing a registration flag, which will be described later. For example, the presence or absence of the registration flag can be checked by a gate sensor at an entrance to the document reading apparatus 1, and a warning can be made by a notification unit such as a buzzer when an RFID tag with no registration flag is placed the document reading apparatus 1.

Figure 2A:
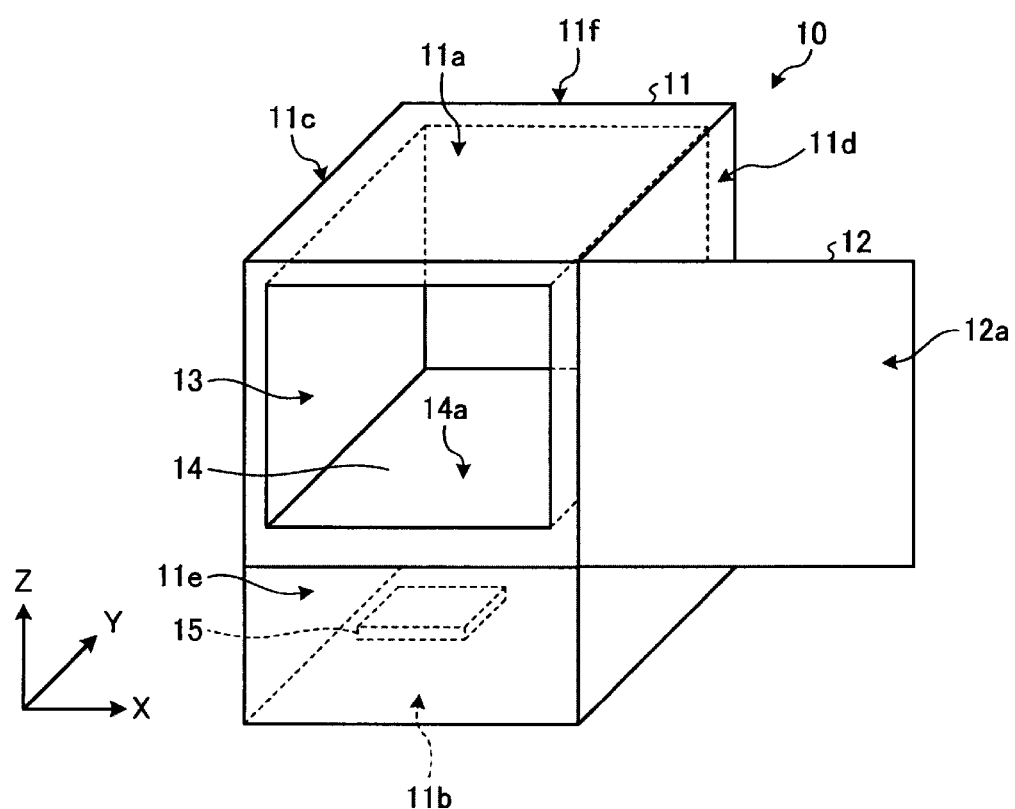
FIG. 2A and FIG. 2B are schematic external perspective views of a reading unit according to the first embodiment.
Figure 2B:
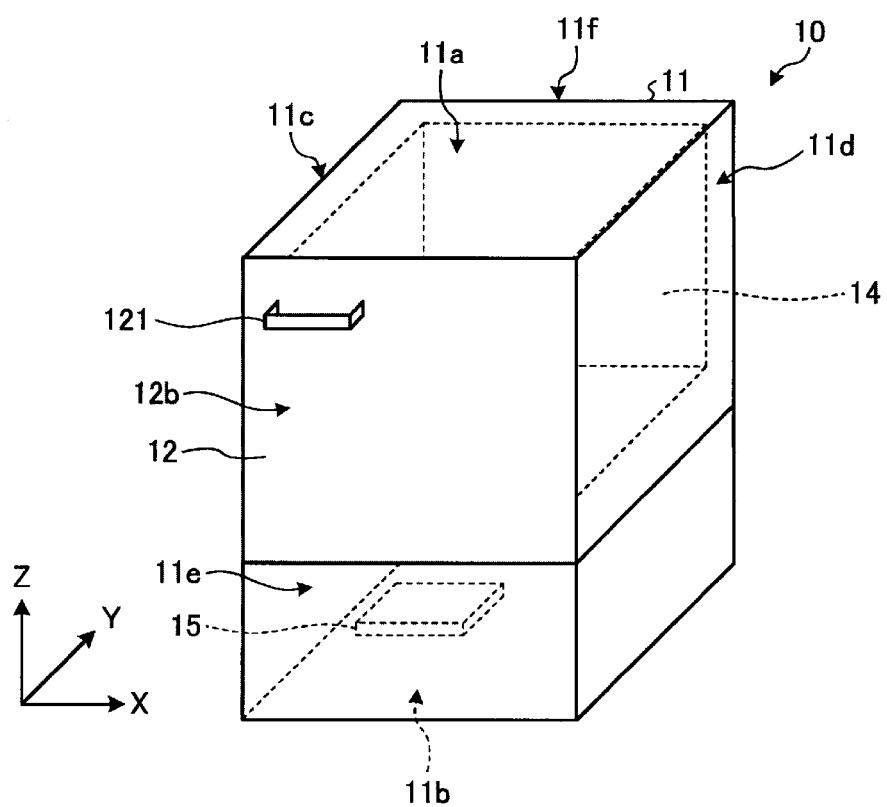

FIG. 2A, and FIG. 2B illustrate schematic external perspective views of the reading unit 10. FIG. 2A illustrates the reading unit 10 with the door 12 open. FIG. 2B illustrates the reading unit 10 with the door 12 closed.

The reading unit 10 includes the housing 11, the walls of which forms an exterior of the reading unit 10, and the door 12. One of the walls of the housing 11 has an opening portion 13, and the door 12 covers or uncovers the opening portion 13.

The housing 11 has a space for placing documents inside. The housing 11 is formed in a box-like shape, including an upper wall 11a, a lower wall 11b, a left side wall 11c, a right side wall 11d, a front wall 11e, and a rear wall 11f. Here, a set of the upper wall 11a and the lower wall 11b, a set of the left side wall 11c and the right side wall 11d, and a set of the front wall 11e, including the door 12, and the rear wall 11f are respectively parallel or substantially parallel to each other. For example, the housing 11 has a depth in the Y-direction, which is larger than a width in the X-direction. Each of the depth, the width, and a height in the Z-direction of the housing 11 is equal to or more than a half of a wavelength of a radio wave emitted from an RFID antenna 15, which will be described later.

Inner wall surfaces of the housing 11 are formed made of a radio wave reflective material, such as metal. Outer wall surfaces of the housing 11 may be formed of a radio wave reflective material in the same manner as the inner wall surfaces, or may be formed of a radio wave absorbing material.

A user can insert the document D1 into a storage chamber 14 inside of the housing 11 or extract the document from the storage chamber 14 through the opening portion 13 on the front wall 11e of the housing 11. The opening portion 13 has a size through which a plurality of documents D1 simultaneously. A portion of the front wall 11e on the periphery of the opening portion 13 may be placed inwards by an amount depending on a thickness of the door 12, so that an outer surface 12b of the door 12 and an outer surface of the front wall 11e are aligned.

The door 12 attached to the housing 11 covers or uncovers the opening portion 13. Specifically, the door 12 is attached to the housing 11 so that the door 12 opens or close the opening portion 13 to the storage chamber 14 by a hinge (not specifically illustrated) on a right front surface of the housing 11. An opening-closing lever 121 is attached to the outer surface 12b of the door 12. A user opens or closes the door 12 by holding the opening-closing lever 121. The inner surface 12a of the door 12 is formed of a radio wave reflective material. The outer surface 12b of the door 12 may be formed of a radio wave reflective material in the same manner as the inner surface, or may be formed of a radio wave absorbing material.

The storage chamber 14 inside of the housing 11 can accommodate the plurality of documents D1. The storage chamber 14 is formed in a box-like shape, and is fixed inside of the housing 11 such that the opening portion 13 of the housing opens to the storage chamber 14. Inner wall surfaces of the storage chamber 14 are formed of a plate-shaped insulating material such as wood, plastic resin, or glass. When the door 12 is open, a user can insert the document D1 into the storage chamber 14, or extract the document D1 from the storage chamber 14 through the opening portion 13 of the housing 11. In the storage chamber 14, the document D1 is mounted, or placed, on a lower surface 14a, which is also referred to as mounting surface. When the door 12 is closed, the opening portion 13 is covered by the inner surface 12a of the door 12. Thus, the inside of the storage chamber 14 in the housing 11 is shielded from outside of the housing 11. The document D1 may be within a storage container, which is formed of a radio wave transmissive material.

In the housing 11, a planar RFID antenna 15, a circuit board (not illustrated), and the like are provided between the lower wall 11b of the housing 11 and the lower surface 14a of the storage chamber 14. For example, the RFID antenna 15 is a patch antenna, and has an antenna surface facing the upper wall 11a. The antenna surface of the RFID antenna 15 is parallel to the upper wall 11a and the lower wall 11b of the housing 11.

The RFID antenna 15 communicates with the RFID tag T1 attached to the document D1 in the storage chamber 14 in the housing 11 by emitting a radio wave in the UHF band or the like. The RFID antenna 15 emits a radio wave when the door 12 is closed, in cooperation with a reader-writer unit 41, which will be described later. The RFID antenna 15 may be disposed on the lower wall 11b of the housing 11, or may be disposed at a position separated from the lower wall 11b. Moreover, it is preferable that the circuit board is disposed at a position which does not obstruct the radio wave reflection by the lower wall 11b. For example, a bottom surface (not illustrated) of the housing 11 may be under the lower wall 11b, and the circuit board may be disposed between the lower wall 11b and the bottom surface.

Although not specifically illustrated in FIG. 2A and FIG. 2B, the housing 11 includes an opening-closing detecting unit 42 (see FIG. 5) for detecting the open state or the closed state of the door 12. For example, the opening-closing detecting unit 42 can include a micro switch or a magnetic sensor located at or near a portion of the housing 11 which is in contact with or is close to the door 12 when the door 12 is in the closed state, or at or near the hinge of the door 12. When the door 12 is in the closed state, the door 12 covers the opening portion 13, thereby blocking light from the outside. Thus, the opening-closing detecting unit 42 can include a light sensor located at or near a portion of the housing 11 which is in contact with or is close to the door 12, or in the storage chamber 14.

In the above configuration, the RFID antenna 15 emits a radio wave toward the storage chamber 14 (upward) when that the door 12 is in the closed state. For example, when the RFID tag T1 is a passive type that does not include a battery, the RFID antenna 15 amplifies unmodulated carrier waves supplied from the reader writer unit 41, and emits the amplified carrier waves as radio waves. Then in response to the interrogation radio waves, the RFID antenna 15 receives a response signal including the information, such as the identification code modulated in the reflected radio wave, from the RFID tag T1 present within in a response range in the storage chamber 14. The RFID antenna 15 sends the received radio waves to the reader writer unit 41, and the reader writer unit 41 demodulates the received carrier wave, and then sends the demodulated information to a control unit 40. Thus, the information stored in the RFID tag T1 can be read with the RFID antenna 15.

The radio wave emitted from the RFID antenna 15 is reflected by the inside of the housing 11. Specifically, the radio wave emitted from the RFID antenna 15, also referred to as the transmission wave, is reflected by the upper wall 11a of the housing 11. The radio wave reflected by the upper wall 11a of the housing 11, also referred to as the first reflected wave, is reflected by the lower wall 11b as a second reflected wave. That is, the radio wave emitted from the RFID antenna 15, is reflected between two flat inner wall surfaces (also referred to as between the reflective surfaces) of the upper wall 11a and the lower wall 11b which face each other by interposing the antenna surface therebetween. Since the reflection between the reflective surfaces is the fixed end reflection, a phase of the radio wave is shifted by 180 degrees.

Due to interference of the radio waves, which are the transmission wave, the first reflected wave, and the second reflected wave superposed, the housing 11 may contain a region in which an electric field intensity is low (i.e., null point). Hereinafter, a configuration of the housing 11 in which the null point occurs will be described in the related art.

Figure 3:
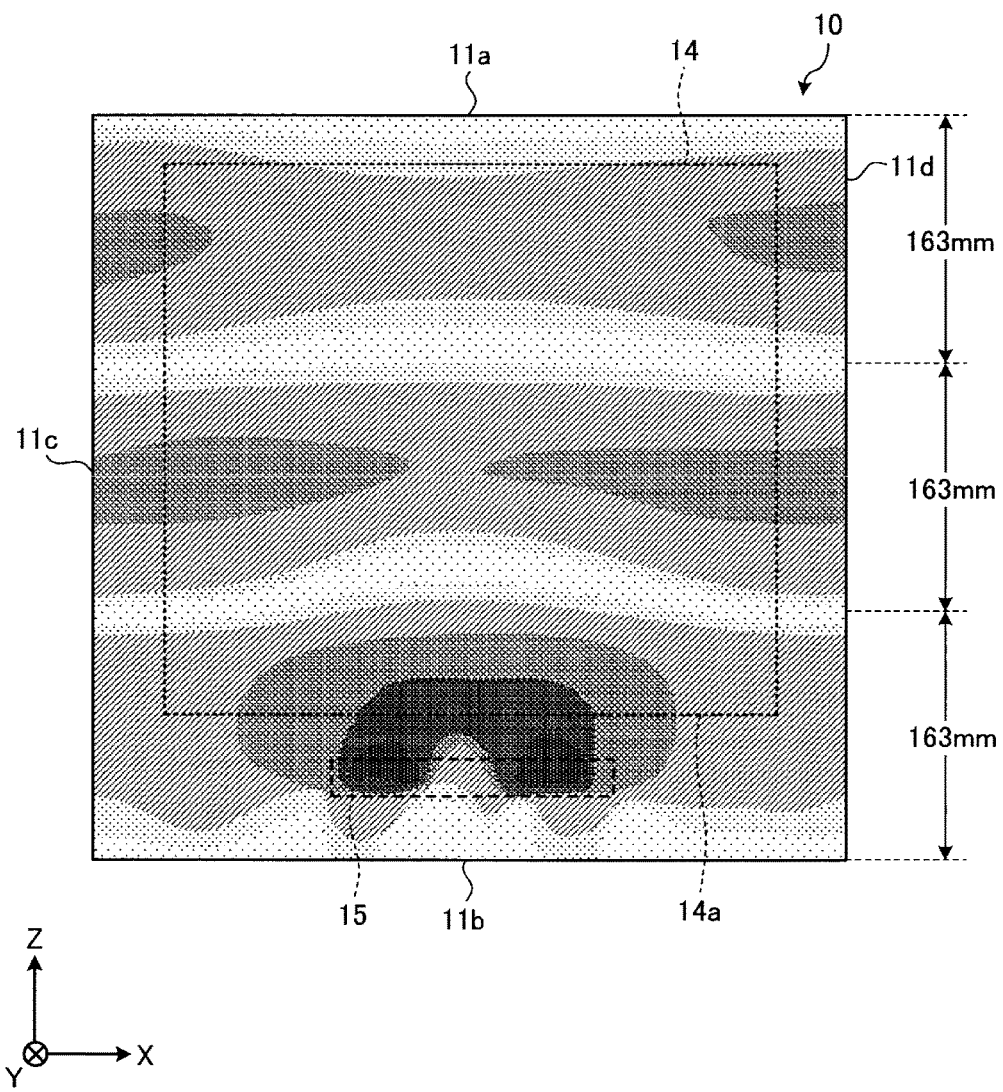
FIG. 3 illustrates an example of electric field intensity distribution inside a housing of a prior art configuration.

FIG. 3 illustrates an example of electric field intensity distribution inside the housing 11 of related prior art configuration, viewed along the Z axis in FIG. 1, FIG. 2A, and FIG. 2B. In FIG. 3, the electric field intensity distribution of the radio waves emitted from the RFID antenna 15 is represented by dark/light shades. Here, the RFID antenna 15 is disposed at a position of 52 mm from the lower wall 11b of the housing 11, and emits a radio wave of a 920 MHz band (wavelength of 326 mm) upward. A distance from the RFID antenna 15 to the upper wall 11a of the housing 11 is 437 mm. In other words, the distance between the upper wall 11a and the lower wall 11b of the housing 11 (between the reflective surfaces) is 489 mm.

Under the above conditions, if the radio wave is emitted from the RFID antenna 15, as illustrated in FIG. 3, the electric field intensity distribution is divided into three zones, and with a weak field intensity region, also referred to as a null point, in which the electric field intensity in becomes very weak. The null points are located at positions separated by a ½ wavelength (163 mm) from the upper wall 11a and the lower wall 11b of the housing 11, respectively. The superposed radio waves are strengthened with each other and are canceled with each other to form greater and lower amplitudes, respectively, since the distance between the reflective surfaces is substantially the same as a 3/2 wavelength (489 mm). In more detail, the superposed radio waves are canceled by each other at every ½ wavelength. In such a null points, the RFID antenna 15 cannot read the RFID tag T1 placed or present there at, and thus there is a problem in that there may be failure in reading RFID tags T1 at the null point(s).

In the reading unit 10 of the first embodiment, the housing 11 is formed with a size that can reduce the occurrence of the null points. In more detail, in the reading unit 10, the distance between the reflective surfaces of the upper wall 11a and the lower wall 11b of the housing 11 is set to a length based on an odd number multiple of a ¼ wavelength of the radio wave emitted from the RFID antenna 15. Specifically, "length based on" conceptually includes not only a length of an odd number multiple of a ¼ wavelength, but also a length about a length of an odd number multiple of a ¼ wavelength. The tolerance range on the length is not particularly limited as long as it is less than a ¼ wavelength. However, it is preferable that the width is determined depending on usage environments, a material (in particular, the material's dielectric constant) of the document D1 in the housing 11, or the like. For example, the tolerance may be 10% of a ¼ wavelength.

Figure 4:
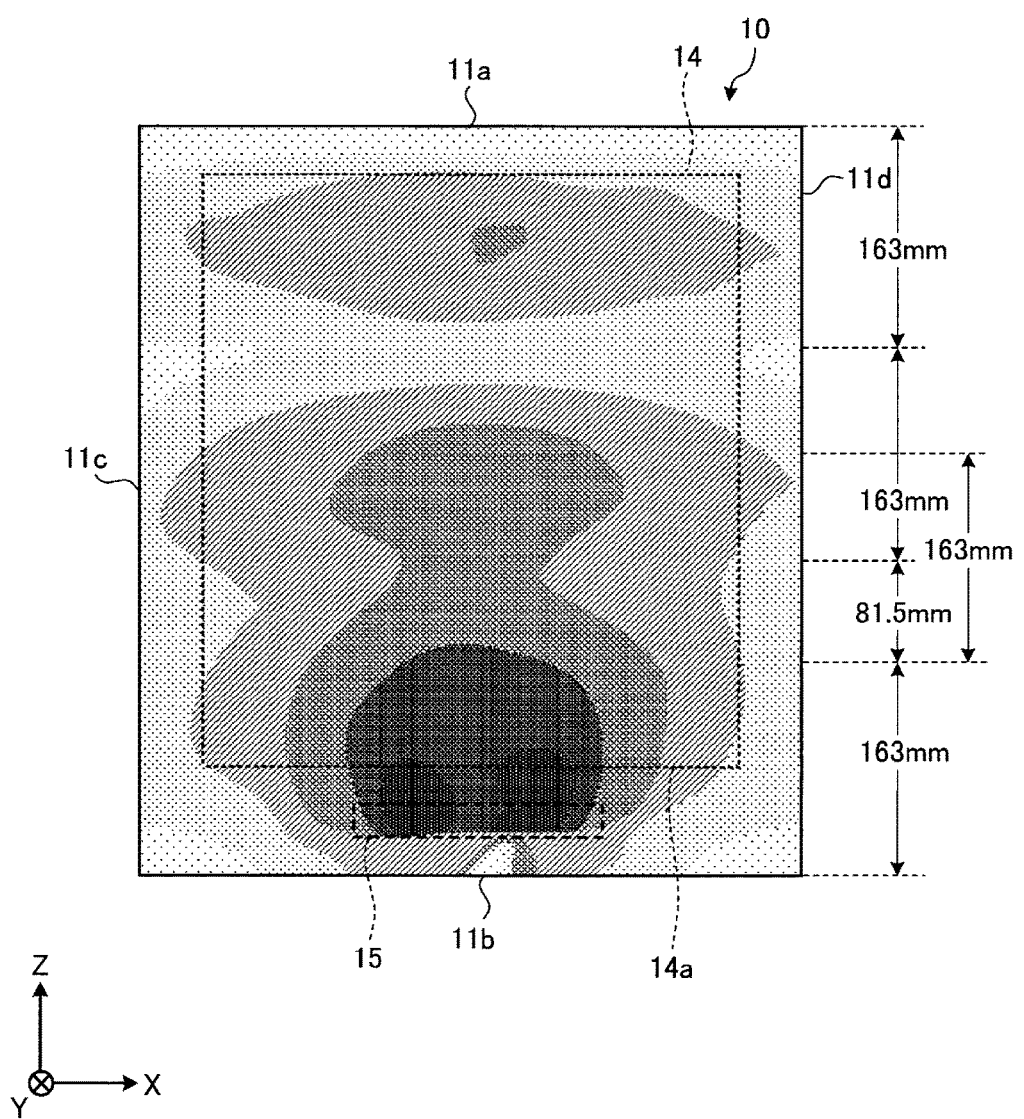
FIG. 4 illustrates an example of electric field intensity distribution a housing according to the first embodiment.

FIG. 4 illustrates an example of electric field intensity distribution inside the housing 11 of the first embodiment viewed along the Z axis in FIG. 1, FIG. 2A, and FIG. 2B. In FIG. 4, the electric field intensity is represented by dark/light shades. The RFID antenna 15 is disposed at a position of 52 mm from the lower wall 11b of the housing 11, and emits the radio wave of the 920 MHz band (wavelength of 326 mm) upward. The distance from the RFID antenna 15 to the upper wall 11a of the housing 11 is 517.5 mm. That is, the distance between the upper wall 11a and the lower wall 11b (between the reflective surfaces) of the housing 11 is 570.5 mm seven times of the ¼ wavelength (81.5 mm) of the radio wave emitted from the RFID antenna 15.

Under the above conditions, if the radio wave is emitted from the RFID antenna 15, the electric field intensity distribution is as illustrated in FIG. 4. As illustrated in FIG. 4, the occurrence of the null points is reduced, and the electric field intensity distribution in the housing 11 is more uniform in comparison with FIG. 3. In this manner, by setting the distance between the reflective surfaces to a length based on an odd number multiple of the ¼ wavelength, it is possible to prevent the interference of the superposed wave being strengthened with each other, or canceled with each other, thereby reducing the occurrence of the null points.

When the radio wave transmissive material is disposed between the reflective surfaces of the radio wave as the storage chamber 14, it is preferable that the distance between the reflective surfaces is designed to supplement a shortening amount of the wavelength when the radio wave transmits through the storage chamber 14.

In more detail, since it is known that the wavelength of the radio wave is shortened depending on the dielectric constant of the transmissive material through which it passes, the distance between the reflective surfaces can be adjusted depending on the dielectric constant and/or a thickness of the radio wave transmissive material configuring the storage chamber 14.

An adjustment method thereof is not particularly limited, and various methods can be adopted. For example, a shortening rate v of the wavelength to a dielectric constant Er can be calculated by using an expression of $v=1/\sqrt{Er}$ or the like. Next, a correction value is calculated by dividing the thicknesses of the upper surface and the lower surface 14a forming the storage chamber 14 by the shortening rate v. Therefore, the length obtained by adding the correction value to the length based on an odd number multiple of the ¼ wavelength of the RFID antenna 15 is designed to be the distance between the reflective surfaces. Thus, since it is possible to remove an influence of the wavelength shortening due to the radio wave transmissive material exiting in the housing 11, it is possible to reduce the occurrence of the null points more efficiently.

In the above configuration, the distance between the upper wall 11a and the lower wall 11b of the housing 11 is set to the length based on the odd number multiple of the ¼ wavelength of the radio wave emitted from the RFID antenna 15. However, the distance between other surfaces may be designed in the same manner. Specifically, the distance between the left side wall 11c and the right side wall 11d of the housing 11, or the distance between the front wall 11e (inner surface 12a of the door 12) and the rear wall 11f of the housing 11 may be also set to be the length based on the odd number multiple of the ¼ wavelength of the radio wave emitted from the RFID antenna 15.

Figure 5:
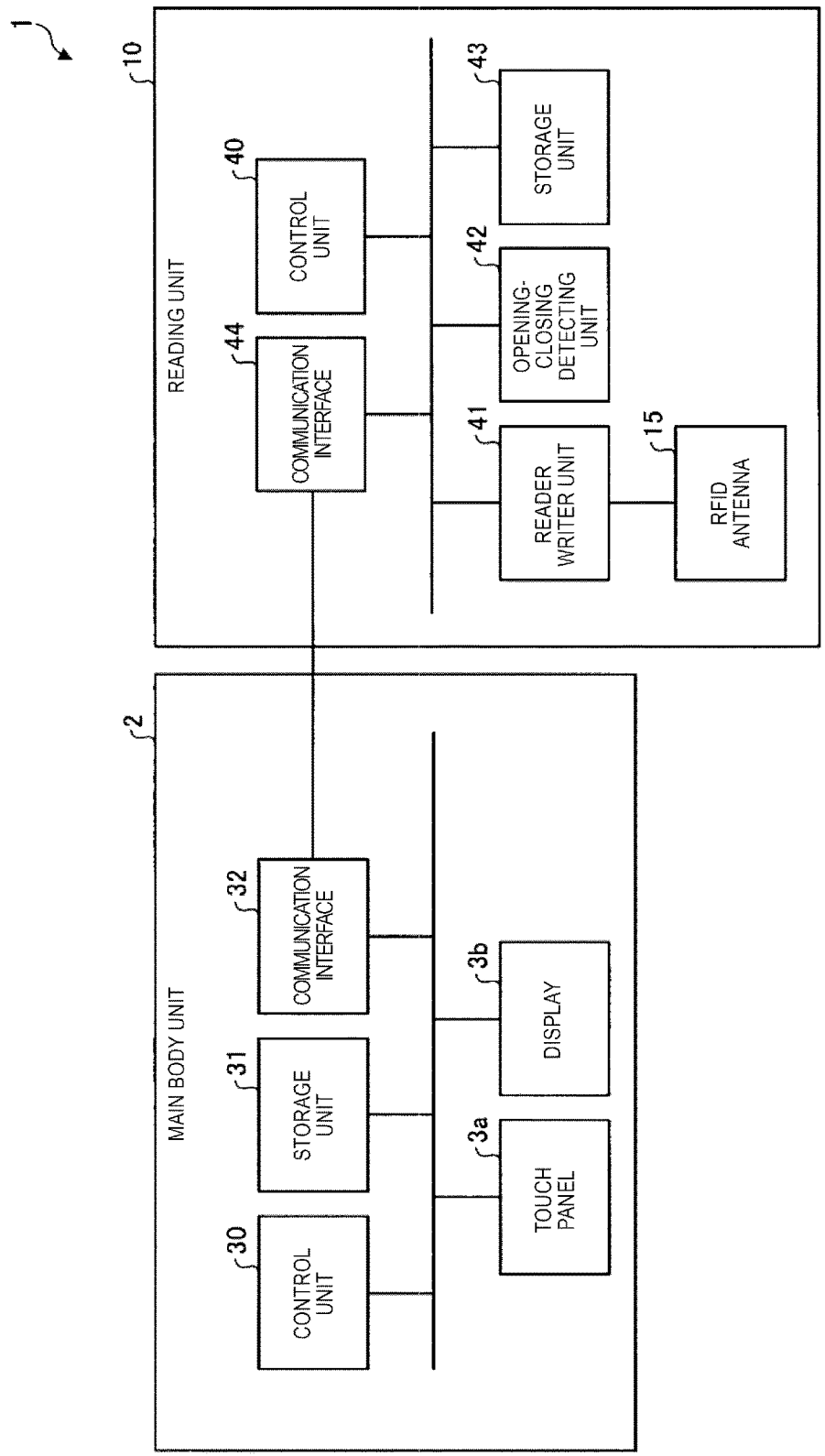
FIG. 5 illustrates hardware aspects of a document reading apparatus according to the first embodiment.

Next, hardware aspects of the document reading apparatus 1 will be described. FIG. 5 illustrates hardware aspects of the document reading apparatus 1 (the main body unit 2 and the reading unit 10).

The main body unit 2 includes a control unit 30 of a computer including a CPU (Central Processing Unit), a ROM (Read Only Memory), a RAM (Random Access Memory), and the like. The ROM stores various types of programs executed by the CPU or various types of data. The RAM temporarily stores the data or the programs when the CPU executes various types of programs.

The touch panel 3a, and the display 3b are connected to the control unit 30, through various types of input-output circuits (not illustrated).

A storage unit 31, a communication interface 32, and the like are connected to the control unit 30, through various types of input-output circuits (not illustrated).

The storage unit 31 is a storage device including a nonvolatile storage medium such as an HDD (Hard Disk Drive) or an SSD (Solid State Drive). The storage unit 31 stores various types of programs or various types of data relating to an operation of the main body unit 2. The storage unit 31 stores the document code read by the reading unit 10. The storage unit 31 may store a data table (referred to as a table, hereinafter) such as database in which the document D1 is associated with the document code, and the information of the user carrying the document D1 are correlated in association with the document code. The communication interface 32 is an interface that performs sending and receiving of various types of data with the reading unit 10.

The reading unit 10 includes a control unit 40 including a CPU, a ROM, a RAM, and the like. The ROM stores various types of programs executed by the CPU or various types of data. The RAM temporarily stores the data or the programs when the CPU executes various types of programs.

The reader writer unit 41, the opening-closing detecting unit 42, a storage unit 43, a communication interface 44, and the like are connected to the control unit 40, through various types of input-output circuits (not illustrated).

The reader writer unit 41 sends a modulated radio wave for reading and writing of the RFID tag T1, by driving the RFID antenna 15. The reader writer unit 41 outputs various types of information (for example, the document code) read from the RFID tag T1 through the RFID antenna 15 to the control unit 40. The reader writer unit 41 outputs the information (for example, flag information) of a writing target through the RFID antenna 15. Thus, the reader writer unit 41 performs the writing of the information in the RFID tag T1.

The opening-closing detecting unit 42 detects the open state or the closed state of the door 12. A detection result of the opening-closing detecting unit 42 is output to the control unit 40. The storage unit 43 is a storage device including a nonvolatile storage medium such as an HDD or an SSD. The storage unit 43 stores various types of programs or various types of data relating to the operation of the reading unit 10. The communication interface 44 is an interface for performing the sending and the receiving of various types of data between the communication interface 44 and the main body unit 2. The control unit 40, the reader writer unit 41, the storage unit 43, and the communication interface 44 included in the reading unit 10 are mounted on a circuit board which is not illustrated in the drawing.

Figure 6:
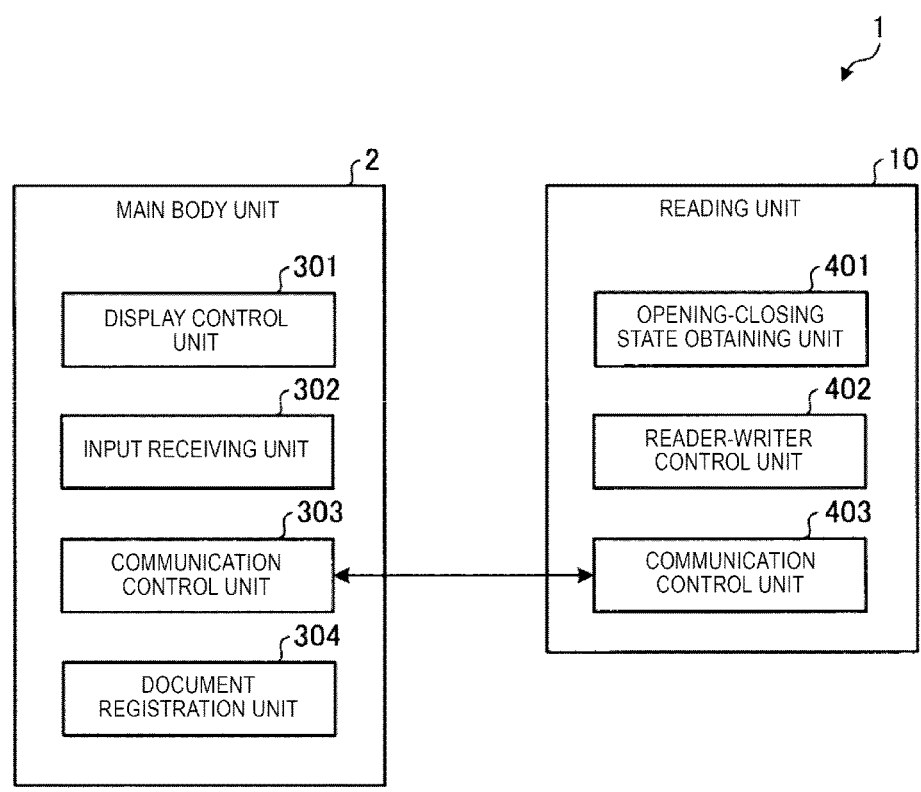
FIG. 6 is a block diagram of a document reading apparatus according to the first embodiment.

Next, functional aspects of the document reading apparatus 1 will be described. FIG. 6 illustrates the functional aspects of the document reading apparatus 1 (the main body unit 2 and the reading unit 10).

The control unit 30 (CPU) of the main body unit 2 causes a display control unit 301, an input receiving unit 302, a communication control unit 303, and a document registration unit 304 to be realized as a functional unit in cooperation with a program which is stored in the storage unit 31.

The display control unit 301 controls the display 3b, and causes the display 3b to display various types of screens. For example, the display control unit 301 causes a screen including a reading start button for instructing a start of the reading of the document code (RFID tag T1), and a reading end button for instructing an end of the reading to be displayed. When the table is stored in the storage unit 31, the display control unit 301 may read the information corresponding to the document code sent from the reading unit 10, and may cause the display 3b to display the information.

The input receiving unit 302 receives an operation input through the touch panel 3a. For example, when the button is touched (touch operation) on an operation screen which is displayed on the display 3b, the input receiving unit 302 outputs the instruction information corresponding to the button to the control unit 30.

The communication control unit 303 controls the communication interface 32, and sends and receives various types of information between the communication control unit 303 and the reading unit 10 through the communication interface 32. For example, if the reading start button is pressed, the communication control unit 303 sends the instruction information instructing a reading start to the reading unit 10. The communication control unit 303 receives the document code sent from the reading unit 10. If the reading end button is pressed, the communication control unit 303 sends the instruction information instructing a reading end to the reading unit 10. If a sales registration is completed by the document registration unit 304, the communication control unit 303 sends the instruction information instructing a completion of the registration to the reading unit 10.

The document registration unit 304 registers the document code sent from the reading unit 10 as a read document code, by storing the document code in a predetermined region of the storage unit 31. Specifically, the document registration unit 304 stores the document code which is received by the communication control unit 303 in a storage region (for example, database or the like) for registration, together with a date in which the reception thereof is performed. The storage region for registration may be a form in which an external device which can communicate with the main body unit 2 is included.

The control unit 40 (CPU) of the reading unit 10 causes an opening-closing state obtaining unit 401, a reader-writer control unit 402, and a communication control unit 403 to be realized as a functional unit in cooperation with the program stored in the storage unit 43.

The opening-closing state obtaining unit 401 obtains opening-closing state information indicating whether the door 12 is in the open state or is in the closed state, in cooperation with the opening-closing detecting unit 42.

The reader-writer control unit 402 performs the reading of the RFID tag T1 which is attached to the document D1, and the writing to the RFID tag T1, by controlling the reader writer unit 41.

Specifically, when a reading start is instructed from the document reading apparatus 1, and the opening-closing state information obtained by the opening-closing state obtaining unit 401 indicates the closed state of the door 12, the reader-writer control unit 402 starts reading.

If a reading end is instructed from the main body unit 2, the reader-writer control unit 402 ends the reading by the reader writer unit 41. If a completion of the registration is instructed from the main body unit 2, the reader-writer control unit 402 starts writing of a registration flag by controlling the reader writer unit 41. Here, the registration flag is the information indicating the completion of the document registration, and is written in a predetermined storage region included in the RFID tag T1.

When the door 12 is in the open state between the reading start of the RFID tag T1 and the writing of the registration flag, the reader-writer control unit 402 ends the reading, and performs resetting processing in which the document codes read by that time are reset. By the resetting processing, the resetting of the document code which is sent for registration to the document reading apparatus 1 is performed. Therefore, the reader-writer control unit 402 executes the reading of the RFID tag T1 again, if it is confirmed that the door 12 is in the closed state again.

In this manner, it is possible to reliably read the document D1 in the storage chamber 14 even if the document D1 is extracted from the storage chamber 14, or if another document D1 which has not yet been read is added to the storage chamber 14, before the writing of the registration flag. It may be a form in which a screen for notifying of the open state of the door 12 is displayed on the display 3b of the main body unit 2, by notifying the main body unit 2 of the open state of the door 12.

The communication control unit 403 controls the communication interface 44, and sends and receives various types of information between the communication control unit 403 and the main body unit 2 through the communication interface 44. For example, the communication control unit 403 receives the instruction information for instructing the reading start which is sent from the main body unit 2. The communication control unit 403 sends the document code which the reader writer control unit 402 reads from the RFID tag T1 to the main body unit 2. The communication control unit 403 receives the instruction information for instructing the reading end which is sent from the main body unit 2. Moreover, the communication control unit 403 receives the instruction information for instructing the completion of the registration which is sent from the main body unit 2.

Figure 7:
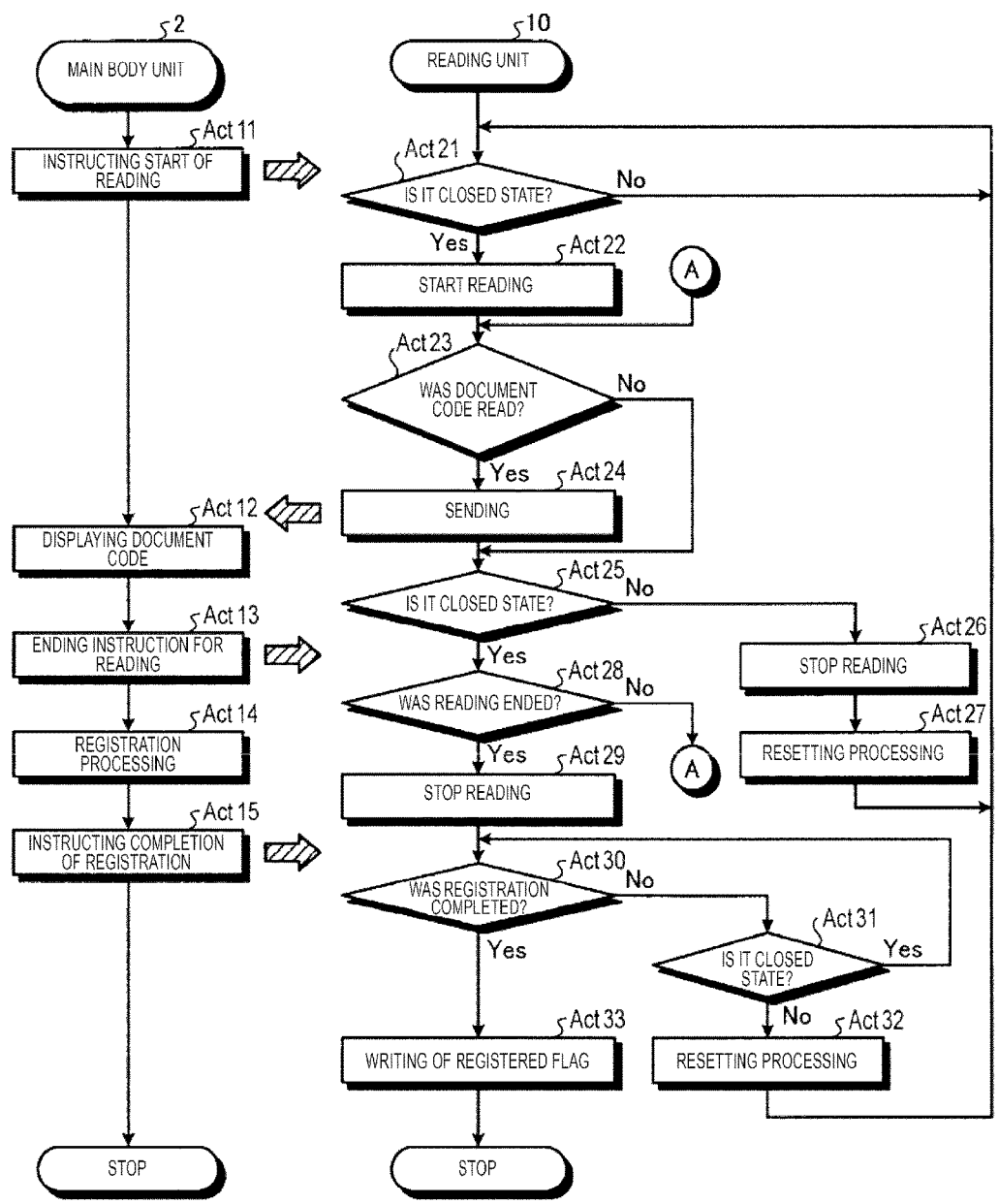
FIG. 7 is a flowchart of an operation of a document reading apparatus according to the first embodiment.

Next, an operation of the document reading apparatus 1 will be described. FIG. 7 is a flowchart of an operation of the document reading apparatus 1 (including the main body unit 2 and the reading unit 10).

The user who uses the document reading apparatus 1 opens the door 12, and places the document D1 in the storage chamber 14. Next, the user presses the reading start button which is displayed on the display 3b of the main body unit 2. Then, the process is started.

In the main body unit 2, if the input receiving unit 302 receives the operation of the reading start button, the communication control unit 303 sends the instruction information for instructing the reading start to the reading unit 10 (Act S11).

In the reading unit 10, when the communication control unit 403 receives instruction information for instructing a start of reading, the reader-writer control unit 402 determines whether or not the door 12 is in a closed state based on opening-closing state information which is obtained by the opening-closing state obtaining unit 401 (Act 21). Here, the reader-writer control unit 402 stands by until the door 12 enters a closed state (No in Act 21), when it is determined that the door 12 is in the open state. In addition, it may be a form in which the reader-writer control unit 402 causes a screen for urging closing of the door 12 to be displayed, by cooperating with the display control unit 301 of the main body unit 2 at a standby time in Act 21.

When it is determined that the door 12 is in a closed state (Yes in Act 21) in Act 21, the reader-writer control unit 402 starts reading of the RFID tag T1 (Act 22). Subsequently, the reader writer unit 41 determines whether or not a document code is read from the RFID tag T1 (Act 23). Here, when the document code is not read (No in Act 23), the process proceeds to Act 25.

When the document code is read (Yes in Act 23), the communication control unit 403 sequentially sends the document code (Act 24) to the main body unit 2, and the process proceeds to Act 25.

In the subsequent Act 25, the reader-writer control unit 402 determines whether or not the door 12 is in a closed state, based on opening-closing information which is obtained by the opening-closing state obtaining unit 401 (Act 25). When it is determined that the door is in an open state (No in Act 25), the reader-writer control unit 402 stops reading of the RFID tag T1 (Act 26). In addition, the reader-writer control unit 402 performs resetting processing in which a document code which is read by that time is reset (Act 27), and the process returns to Act 21 again. By performing the resetting processing, the document code which is sent to the main body unit 2, and is registered is also subjected to resetting.

In addition, when it is determined that the door is in a closed state in Act 25 (Yes in Act 25), the reader-writer control unit 402 determines whether or not ending of reading is instructed from the main body unit 2 (Act 28). Here, when there is no instruction of ending reading (No in Act 28), the process returns to Act 23.

When reading of the RFID tag T1 is started in a state in which the storage chamber 14 is vacant, a loop of No in Act 23→Yes in Act 25→No in Act 28 is continued in a state in which the RFID tag T1 is not read at all. Therefore, when a predetermined time is passed (for example, 5 seconds), or the above described loop is executed for a predetermined times in the state in which the RFID tag T1 is not read at all, reading of the RFID tag T1 may be forcibly ended, in order to avoid such a state. In addition, in such a case, it is preferable that the reader-writer control unit 402 cause a message denoting that it is not possible to read the RFID tag T1 to be displayed by cooperating with the display control unit 301 of the main body unit 2.

In the main body unit 2, when the communication control unit 303 receives a document code from the reading unit 10, the display control unit 301 displays the document code on the display 3b (Act 12).

The user who operates the main body unit 2 refers to the document code which is displayed on the display 3b, and operates the reading end button which is displayed on the display 3b, when confirming that document codes of all of the documents D1 which are input to the storage chamber 14 are displayed. In addition, when the input receiving unit 302 receives the operation of the reading end button, the communication control unit 303 sends instruction information for instructing ending of reading to the reading unit 10 (Act 13).

In the reading unit 10, when the communication control unit 403 receives instruction information for instructing ending of reading, the reader-writer control unit 402 determines that ending of reading is instructed (Yes in Act 28). Subsequently, the reader-writer control unit 402 stops reading of the RFID tag T1 (Act 29).

The reader-writer control unit 402 determines whether or not a completion of a registration is instructed from the main body unit 2 (Act 30). When there is no instruction of a completion of a registration (No in Act 30), the reader-writer control unit 402 determines whether or not the door 12 is in a closed state, based on the opening-closing state information which is obtained by the opening-closing state obtaining unit 401 (Act 31).

Here, when it is determined that the door is in a closed state (Yes in Act 31), the process returns to Act 30. In addition, when it is determined that the door is in an open state (No in Act 31), the reader-writer control unit 402 performs the same resetting processing as that in Act 27 (Act 32), and the process returns to Act 21 again.

In the main body unit 2, the document registration unit 304 performs registration processing with respect to each document code which is displayed (Act 14). In addition, the communication control unit 303 sends instruction information for instructing a completion of a registration to the reading unit 10 (Act 15), and ends the process.

In the reading unit 10, when the communication control unit 403 receives instruction information for instructing a completion of a registration, the reader-writer control unit 402 determines that the completion of the registration is instructed (Yes in Act 30). In addition, the reader-writer control unit 402 writes a registration flag in the RFID tag T1 of each document D1 (Act 33), by controlling the reader writer unit 41, and ends the process.

It may be a form in which the reader-writer control unit 402 causes a screen which denotes a state in which the door 12 is still in a closed state to be displayed, by cooperating with the display control unit 301 of the main body unit 2 in the middle of writing the registration flag. In addition, it may be a form in which the reader-writer control unit 402 causes a screen which urges opening of the door 12 to be displayed, by cooperating with the display control unit 301 of the main body unit 2 when writing of the registration flag is ended.

As described above, according to the reading unit 10, it is possible to collectively perform the reading of the RFID tag T1 (which are attached to each of the documents D1), in a state in which the document D1 is physically separated from a user or operator of the reading unit by accommodating the document D1 in the storage chamber 14 for reading, and then closing the door 12. According to the reading unit 10, it is possible to efficiently perform the reading of the RFID tag T1, since it is possible to limit a range to which the radio wave of the RFID antenna 15 extends to the inside of the housing 11. Moreover, in the housing 11, since it is possible to perform the reading and the writing of the RFID tag T1 in the state where the occurrence of the null points is reduced, it is possible to prevent a reading miss and a writing miss of the RFID tag T1.

Second Embodiment

In a second embodiment, a configuration in which the distance between the upper wall 11a and the lower wall 11b of the housing 11 can be changed depending on the wavelength of the radio wave emitted from the RFID antenna 15 will be described. The same reference numerals are used for the components that are substantially the same as those of the first embodiment, and the description of repeated components may be omitted.

Figure 8:
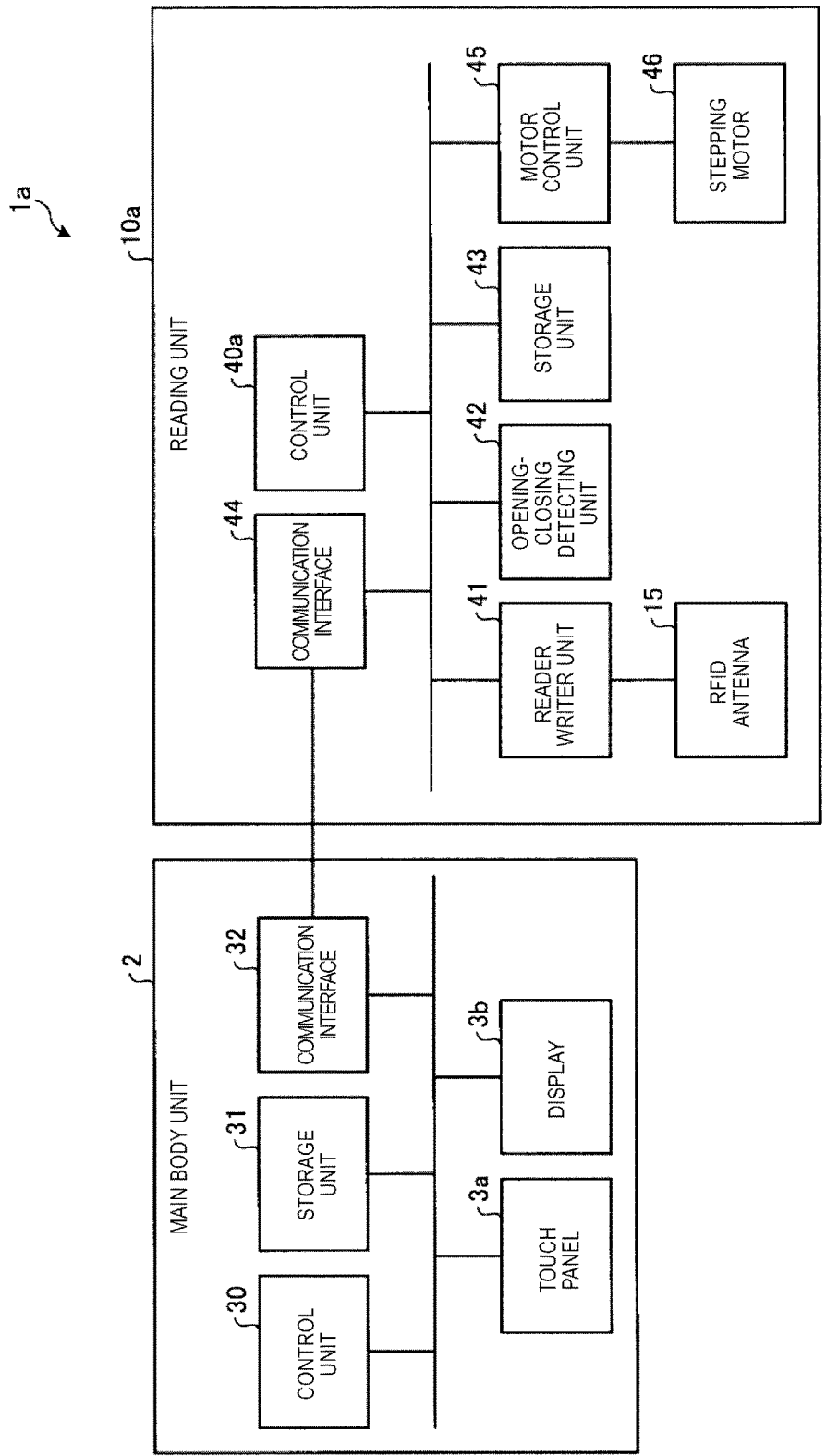
FIG. 8 is a block diagram of a document reading apparatus according to a second embodiment.

First, hardware aspects of a document reading apparatus 1a according to the second embodiment will be described with reference to FIG. 8. FIG. 8 illustrates the hardware aspects of the document reading apparatus 1a (the main body 2 and a reading unit 10a). The configuration of the document reading apparatus 1a is the same as those of FIG. 1, FIG. 2A, and FIG. 2B. However, the lower wall 11b of the housing 11 is configured so that the distance is movable with respect to the upper wall 11a, that is, to be movable in an upward and downward direction.

The reading unit 10a includes a control unit 40a of a computer including formed of a CPU, a ROM, a RAM, and the like. The ROM stores various types of programs executed by the CPU or various types of data. The RAM temporarily stores the data or the program when the CPU executes various types of programs.

A motor control unit 45 or the like is connected to the control unit 40a, through various types of input-output circuits (not illustrated), in addition to the reader writer unit 41, the opening-closing detecting unit 42, the storage unit 43, and the communication interface 44 described above.

The motor control unit 45 is a driver circuit for causing a stepping motor 46 to operate. The motor control unit 45 outputs a pulse signal for rotating the stepping motor 46 by a predetermined angle under the control of the control unit 40a. The stepping motor 46 functions as a power source for moving the lower wall 11b of the housing 11 in the upward and downward direction. A mechanism relating to the movement of the lower wall 11b in the upward and downward direction is not particularly limited, and a known technology can be used. For example, a configuration in which a rotary motion of the stepping motor 46 is changed to a straight line motion by a ball screw mechanism or the like, and the lower wall 11b is moved in the upward and downward direction, may be made.

Figure 9:
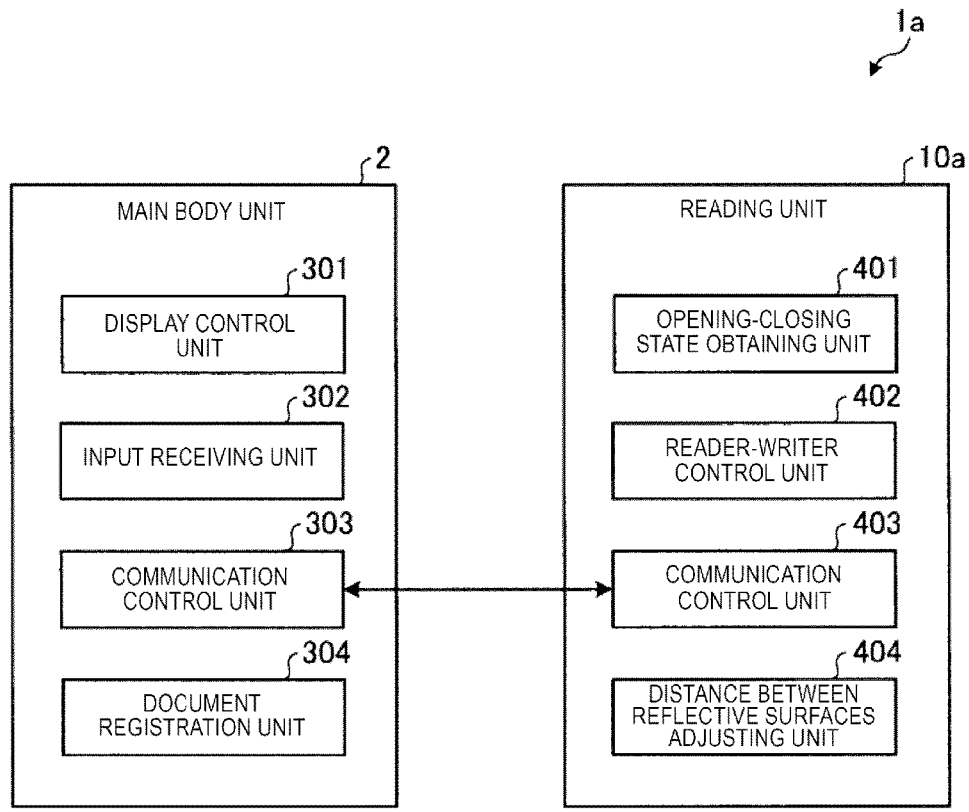
FIG. 9 is a block diagram of a document reading apparatus according to the second embodiment.

Next, functional aspects of the document reading apparatus 1a will be described with reference to FIG. 9. FIG. 9 illustrates the functional aspects of the document reading apparatus 1a (the main body unit 2 and the reading unit 10a).

The control unit 40a (CPU) of the reading unit 10a causes the opening-closing state obtaining unit 401, the reader-writer control unit 402, the communication control unit 403, a distance between reflective surfaces adjusting unit 404 to be realized as a functional unit, in cooperation with the program stored in the storage unit 43.

The distance between reflective surfaces adjusting unit 404 adjusts the distance between the upper wall 11a and the lower wall 11b (between the reflective surfaces), by moving the lower wall 11b in the upward and downward direction, in cooperation with the motor control unit 45. Specifically, the distance between reflective surfaces adjusting unit 404 adjusts a position at which the lower wall 11b is fixed so that the distance between the upper wall 11a and the lower wall 11b becomes the length based on the odd number multiple of the ¼ wavelength, based on the wavelength of the radio wave emitted from the RFID antenna 15. Here, the wavelength of the radio wave emitted from the RFID antenna 15 may be previously stored in the form of setting information or the like, or may be configured to be input through the main body unit 2 or the like. Based on a size of at the time of initial design of the housing 11, that is, a default distance between the upper wall 11a and the lower wall 11b, the distance between reflective surfaces adjusting unit 404 adjusts the default distance to be most efficiently set to the length based on the odd number multiple of the ¼ wavelength.

Figure 10:
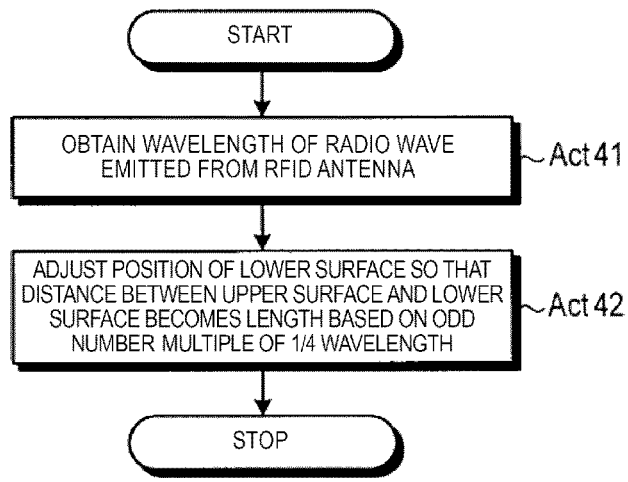
FIG. 10 is a flowchart of an adjustment of a distance between reflective surfaces which is performed by a distance between reflective surfaces adjusting unit in a reading unit according to the second embodiment.

Next, an operation of the document reading apparatus 1a will be described with reference to FIG. 10. FIG. 10 is a flowchart of an adjustment of a distance between reflective surfaces which is performed by the distance between reflective surfaces adjusting unit 404 in the reading unit 10a. The processing is executed prior to the processing of FIG. 7, at the time of mounting the document reading apparatus 1a, at the time of changing the wavelength of the radio wave, or the like.

First, the distance between reflective surfaces adjusting unit 404 obtains the wavelength of the radio wave emitted from the RFID antenna 15, from the setting information or the like (Act 41). Subsequently, based on the default distance between the upper wall 11a and the lower wall 11b, the distance between reflective surfaces adjusting unit 404 adjusts the position of the lower wall 11b so that the default distance becomes the length based on the odd number multiple of the ¼ wavelength (Act 42), and the process is ended.

As an example, assumed is a case where the default distance is 560 mm, and the wavelength of the radio wave emitted from the RFID antenna 15 is 326 mm. In this case, the distance between reflective surfaces adjusting unit 404 adjusts the distance between the upper wall 11a and the lower wall 11b to be 570.5 mm which is the value corresponding to seven times of the ¼ wavelength, by lowering the lower wall 11b as 10.5 mm.

In this manner, the reading unit 10a of the second embodiment adjusts the distance between the upper wall 11a and the lower wall 11b to be the length based on the odd number multiple of the ¼ wavelength, depending on the wavelength of the radio wave emitted from the RFID antenna 15. Thus, even when the wavelength of the radio wave emitted from the RFID antenna 15 is changed, since the distance between the reflective surfaces can be adjusted, it is possible to reduce the occurrence of the null points even in the environments after the changing.

While certain embodiments have been described, these embodiments have been presented by way of example only, and are not intended to limit the scope of the inventions. Indeed, the novel embodiments described herein may be embodied in a variety of other forms; furthermore, various omissions, substitutions, combinations and changes in the form of the embodiments described herein may be made without departing from the spirit of the inventions. The accompanying claims and their equivalents are intended to cover such forms or modifications as would fall within the scope and spirit of the inventions.

For example, in the above example embodiments, the RFID antenna 15 is disposed below the storage chamber 14. However, the position is not limited thereto. For example, the RFID antenna 15 may be disposed to be parallel or perpendicular to the lower surface 14a (e.g., amounting table), and on the upper side, the rear side, the left side, and/or the right side of the storage chamber 14. The antenna surface of the RFID antenna 15 can be disposed facing towards a center of the housing 11 (or storage chamber 14) in parallel with the inner wall surface of the housing 11. Furthermore, the number of RFID antennas 15 is not limited to one. For example, the RFID antenna 15 may be configured such that multiple RFID antennas are respectively disposed in different locations from each other. A distance between a first flat surface (for example, left side wall 11c) facing the antenna surface of the RFID antenna 15 and a second flat surface (for example, right side wall 11d) facing the first flat surface can be set to be the length based on the odd number multiple of the ¼ wavelength from the RFID antenna 15.

In the above example embodiments, the RFID antenna 15 is disposed between two flat surfaces (for example, the upper wall 11a and the lower wall 11b) which face each other inside the housing 11. However, the position of the RFID antenna 15 is not limited thereto. For example, the RFID antenna 15 may be disposed by embedding the RFID antenna 15 in one flat surface thereof so that one flat surface of two flat surfaces which face each other, and the antenna surface of the RFID antenna 15 form the same flat surface.

Furthermore, in the second embodiment, the lower wall 11b among the upper wall 11a and the lower wall 11b of the housing 11 can be configured to be movable in the upward and downward direction. However, the upper wall 11a may also be configured to be movable in the upward and downward direction. Even when the RFID antenna 15 is disposed at other positions, it may be configured in a similar manner. Specifically, one of the first flat surface facing the antenna surface of the RFID antenna 15 inside the housing 11 and the second flat surface, facing the first flat surface may be configured such that the distance of one flat surface to the other flat surface can be changed.

Moreover, in the above example embodiments, reading of the RFID tag T1 is started depending on the operation instruction from the user. However, it is not limited thereto. For example, reading of the RFID tag T1 may be automatically started by being linked to the switching of the door 12 from the open state to the closed state, without separate instruction from the user.

In the above example embodiments, reading is ended, and resetting processing is executed when the door 12 is placed in an open state between a start of reading of the RFID tag T1 and writing of a registration flag. However, the examples are not limited thereto. For example, a locking mechanism for locking the door 12 in a closed state may be provided at a contact portion between the housing 11 of the reading unit 10 and the door 12, and the door 12 (and the locking mechanism) can be controlled so as to prevent the door 12 from be opened. Specifically, a closed state can be held so that the door 12 cannot be opened between starting reading of the RFID tag T1 and writing of the registration flag by controlling the locking mechanism using the reader-writer control unit 402. In this manner, it is possible to prevent a situation in which a document D1 for which a RFID tag T1 is already read from being extracted from the storage chamber 14 before writing of the registration flag, or a situation in which a document D1 for which a RFID tag T1 has not yet been read from being added into the storage chamber 14 before the writing the registration flag.

In the above example embodiments, the reading of the RFID tag T1 is ended depending on the end instruction from the user. However, in other embodiments, for example, if the number of RFID tags T1 that have been read is equal to the number of RFID tags T1 to be read as instructed by the user, the reading may be automatically ended.

Moreover, in the above example embodiments, a document is the target commodity to be read by the reading unit 10. However, the disclosure is not limited thereto, and other commodities besides documents may be used.

What is claimed is:

1. A reading apparatus for reading a wireless tag, the reading apparatus comprising:
   a housing having a chamber and an opening providing an entrance to the chamber;
   a door attached to the housing and covering the opening when closed and permitting access to the chamber when opened; and
   an antenna within the housing and configured to emit a radio wave to read information from a wireless tag inside the chamber, a radiation surface of the antenna being parallel to a first inner wall surface and a second inner wall surface of the housing facing each other, wherein
   the distance between the first and second inner wall surfaces is at least one half of a wavelength of a radio wave emitted from the antenna, and is a length based on an odd number multiple of a quarter of the wavelength, and
   the radio wave emitted from the antenna and radio waves reflected at the first and second inner wall surfaces interfere such that no null points are formed in the chamber at the wavelength of the radio wave emitted from the antenna.

2. The apparatus according to claim 1, wherein inner wall surfaces of the housing comprise a radio wave reflective material.

3. The apparatus according to claim 1, wherein the wireless tag is an RFID tag.

4. The apparatus according to claim 1, wherein the wireless tag is attached to a document.

5. The apparatus according to claim 1, further comprising:
a table inside the housing and of a radio wave transmissive material, the table having a surface on which a storage container can be placed.

6. The apparatus according to claim 5, wherein
the radiation surface of the antenna is parallel to the surface of the table.

7. The apparatus according to claim 5, wherein
the radiation surface of the antenna is perpendicular to the surface of the table.

8. The apparatus according to claim 1, further comprising:
a reader-writer electrically coupled to the antenna and configured to supply signals to the antenna and receive signals from the antenna;
a display configured to display a reading start button and a reading end button; and
a touch panel configured to receive user instruction information corresponding to the pressing of the reading start button and the reading end button.

9. A reading apparatus for reading a wireless tag, the reading apparatus comprising:
a housing having a chamber and an opening providing an entrance to the chamber;
an antenna within the housing and configured to emit a radio wave to read information from a wireless tag inside the chamber, a radiation surface of the antenna being parallel to a first inner wall surface and a second inner wall surface of the housing facing each other; and
a controller configured to control a motor cause the first inner wall surface to move to set the distance between the first and second inner wall surfaces to be at least a one half of a wavelength of a radio wave emitted from the antenna and a length based on an odd number multiple of one quarter of the wavelength such that the radio wave emitted from the antenna and radio waves reflected at the first and second inner wall surfaces interfere such that no null points are formed in the chamber at the wavelength of the radio wave emitted from the antenna.

10. The apparatus according to claim 9, wherein inner wall surfaces of the housing comprise a radio wave reflective material.

11. The apparatus according to claim 9, wherein the wireless tag is an RFID tag.

12. The apparatus according to claim 9, wherein the wireless tag is attached to a document.

13. The apparatus according to claim 9, further comprising:
a table inside the housing and of a radio wave transmissive material, the table having a surface on which a storage container can be placed.

14. The apparatus according to claim 13, wherein
the radiation surface of the antenna is parallel to the surface of the table.

15. The apparatus according to claim 13, wherein
the radiation surface of the antenna is perpendicular to the surface of the table.

16. The apparatus according to claim 9, further comprising:
a reader-writer electrically coupled to the antenna and configured to supply signals to the antenna and receive signals from the antenna that are used in reading the information stored in the wireless tag;
a display configured to display a reading start button and a reading end button; and
a touch panel configured to receive user instruction information corresponding to the pressing of the reading start button and the reading end button.

17. The apparatus according to claim 9, further comprising:
a door attached to the housing and covering the opening when closed and permitting access to the chamber when opened.

18. A method for reading a wireless tag, comprising:
obtaining a wavelength of a radio wave emitted from an antenna within a housing;
adjusting a position of a first inner wall of the housing, by a controller causing a motor to move the first inner wall, such that a distance between the first inner wall and a second inner wall surface of the housing is at least one half of the wavelength of the radio wave emitted from the antenna, and is a length based on an odd number multiple of a quarter of the wavelength; and
reading read information from the wireless tag inside the housing.

* * * * *